US012646472B2

(12) United States Patent
Park et al.

(10) Patent No.: US 12,646,472 B2
(45) Date of Patent: Jun. 2, 2026

(54) DISPLAY DEVICE

(71) Applicant: LG Display Co., Ltd., Seoul (KR)

(72) Inventors: Jeonghyo Park, Paju-si (KR); Joonyoung Kim, Paju-si (KR); Baekhwan Kim, Paju-si (KR); Won Cho, Paju-si (KR); Wooseok Do, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 18/949,546

(22) Filed: Nov. 15, 2024

(65) Prior Publication Data

US 2025/0279071 A1 Sep. 4, 2025

(30) Foreign Application Priority Data

Feb. 29, 2024 (KR) ........................ 10-2024-0029523

(51) Int. Cl.
*G09G 3/3291* (2016.01)
*G09G 3/3266* (2016.01)

(52) U.S. Cl.
CPC ......... *G09G 3/3291* (2013.01); *G09G 3/3266* (2013.01); *G09G 2310/08* (2013.01); *G09G 2320/0233* (2013.01); *G09G 2340/0435* (2013.01)

(58) Field of Classification Search
CPC ............... G09G 3/3266; G09G 3/3291; G09G 2310/08; G09G 2320/0233; G09G 2340/0435
See application file for complete search history.

(56) References Cited

U.S. PATENT DOCUMENTS 10,810,930 B2 * 10/2020 Shim .................... G09G 3/3233
11,107,437 B2 * 8/2021 Rao ........................ G09G 5/006
11,468,839 B2 * 10/2022 Sang .................... G09G 3/3233
11,545,083 B2 * 1/2023 Chung ................. G09G 3/3233
11,605,353 B2 * 3/2023 Sang .................... G09G 3/3233
(Continued)

FOREIGN PATENT DOCUMENTS

KR 10-2019-0081202 A 7/2019

*Primary Examiner* — Gene W Lee
(74) *Attorney, Agent, or Firm* — Birch, Stewart, Kolasch & Birch, LLP

(57) ABSTRACT

A display device can include a display panel including sub-pixels and configured to switch between operating at a first frequency and operating at an $N^{th}$ frequency, the $N^{th}$ frequency being a maximum operating frequency of the display panel, N being a positive integer, a gate driver configured to output a scan signal to the display panel, and a data driver configured to output a data voltage to the display panel. Also, the display device can further include a timing controller configured to receive an external synchronization signal and image data, generate an internal synchronization signal within the timing controller, the internal synchronization signal having a frequency equal to the $N^{th}$ frequency, and in response to generating the internal synchronization signal during a holding period, output a gate start pulse to the gate driver and output the image data to the data driver.

19 Claims, 11 Drawing Sheets

(56) References Cited

U.S. PATENT DOCUMENTS

| | | | | |
|---|---|---|---|---|
| 11,817,055 | B2 * | 11/2023 | Sang | G09G 3/3233 |
| 11,823,619 | B2 * | 11/2023 | Chung | G09G 3/3233 |
| 2008/0136752 | A1 * | 6/2008 | Inoue | G09G 3/2022 345/77 |
| 2009/0122207 | A1 * | 5/2009 | Inoue | G09G 3/2025 348/E5.133 |
| 2009/0237391 | A1 * | 9/2009 | Yanagi | G09G 5/18 345/99 |
| 2022/0199025 | A1 * | 6/2022 | Hong | G09G 3/3258 |
| 2023/0215364 | A1 * | 7/2023 | Lim | G09G 3/3233 345/691 |
| 2024/0038123 | A1 * | 2/2024 | Sang | G09G 3/3233 |
| 2024/0211198 | A1 * | 6/2024 | Zheng | G06F 3/0485 |

* cited by examiner

DISPLAY DEVICE

CROSS-REFERENCE TO RELATED APPLICATION

This application claims priority to Korean Patent Application No. 10-2024-0029523, filed in the Republic of Korea, on Feb. 29, 2024, the entire contents of which are hereby expressly incorporated by reference into the present application.

BACKGROUND

Technical Field

The present disclosure relates to a display device, and more specifically, to driving of a timing controller and nearby devices when a frequency of image data input is changed.

Discussion of the Related Art

Display devices can be mounted on electronic products or home appliances, such as televisions, monitors, laptop computers, smart phones, tablet computers, electronic pads, wearable devices, watches, navigation systems, or vehicle control display devices to display images.

A display device can display moving images. The moving images are displayed by converting still images on a frame basis. Recently, moving image sources are becoming increasingly high-definition, such as 4K and 8K. In particular, a faster scene change is desirable when displaying fast moving images (e.g., video games, action scenes, etc.).

To meet such demand, the display device is being developed to implement high refresh rates. A function of supporting both low and high refresh rates is referred to as a variable refresh rate (VRR) driving. However, when operating at a low refresh rate, the image is not refreshed/updated during the holding period, and a driving transistor can begin to operate in a saturation area which may cause an undesirable increase in the screen luminance and the quality of the image displayed to the user can become impaired. Thus, there exists a need for a display device that can accommodate a variable refresh rate without undesirably increasing the screen luminance or impairing image quality.

SUMMARY OF THE DISCLOSURE

When conventional display devices are driven at a low refresh rate, a data driver and a gate driver do not operate for a holding period. During the holding period, a scan signal and a data voltage are not applied to a display panel. Therefore, there is a problem that pixel degradation cannot be sensed for the holding period.

In addition, when the display device is driven at a low refresh rate, image data input for a refresh period is maintained in a storage capacitor for the holding period. Therefore, as the holding period increases (e.g., as the refresh rate decreases), a driving transistor operates in a saturation area, thereby increasing luminance of a screen. This leads to a problem of uneven screen quality, especially at low grayscales. In addition, this particularly leads to a problem that the image quality is degraded to the extent that a horizontal line to be sensed becomes visible to the user for the refresh period.

According to an embodiment of the present disclosure, a display device includes a display panel including sub-pixels and operating between a first frequency and an $N^{th}$ frequency, a gate driver configured to output a scan signal to the display panel, a data driver configured to output a data voltage to the display panel, and a timing controller configured to receive an external synchronization signal and image data from the outside, output a gate start pulse to the gate driver, and output the image data to the data driver, wherein the timing controller outputs the gate start pulse and the image data in response to an internal synchronization signal with a frequency equal to the $N^{th}$ frequency during a holding period. wherein Preferably, the timing controller generates an internal synchronization signal equal to the $N^{th}$ frequency during a holding period.

According to an embodiment of the present disclosure, the display device can further include a first memory configured to store first image data during a first refresh period, and a second memory configured to store second image data during a second refresh period. The second image data stored in the second memory can be output to the data driver during the holding period following the second refresh period. Third image data can be stored in the first memory during a third refresh period after the holding period.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain principles of the disclosure, which are briefly described below.

DETAILED DESCRIPTION OF THE EMBODIMENTS

Figure 1:
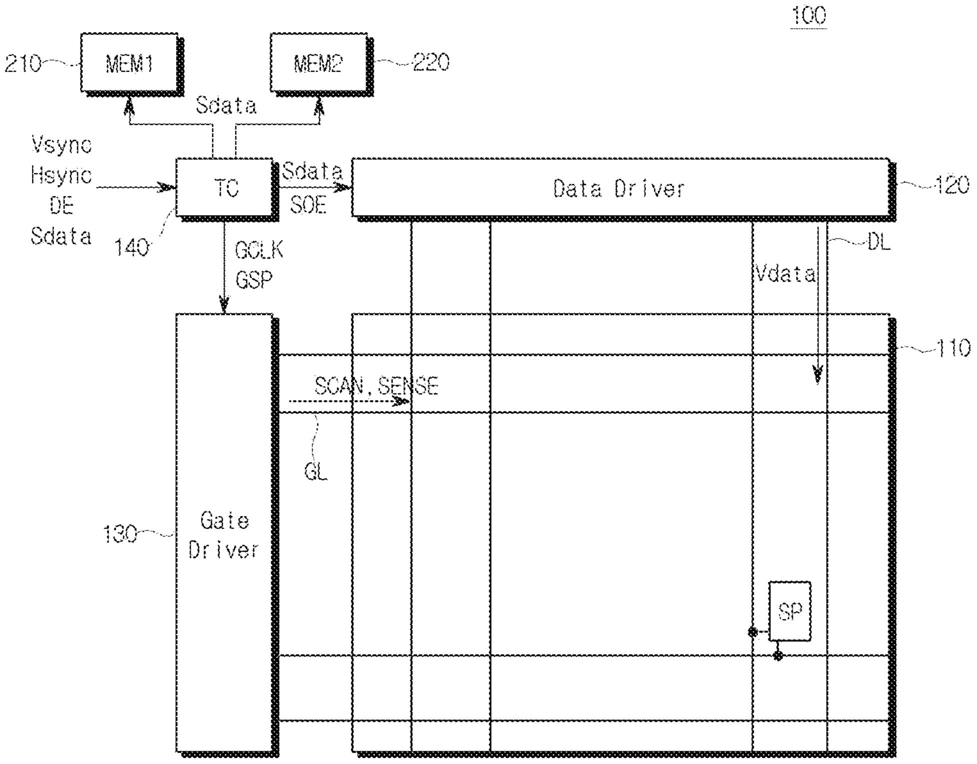
FIG. 1 is a view showing a display device according to an embodiment of the present disclosure.

Advantages and features of the present disclosure and methods for achieving them will become clear with reference to embodiments described below in detail in conjunction with the accompanying drawings. However, the present disclosure is not limited to the embodiments disclosed below but can be implemented in various different forms, the embodiments are merely provided to make the disclosure of the present disclosure complete and fully inform those skilled in the art to which the present disclosure pertains of the scope of the present disclosure, and the present disclosure is only defined by the scope of the appended claims.

Since shapes, sizes, ratios, angles, numbers, and the like disclosed in the drawings for describing the embodiments of the present disclosure are illustrative, the present disclosure is not limited to the illustrated items. The same reference number indicates the same components throughout the specification. In addition, in describing the present disclosure, when it is determined that the detailed description of a related technology may unnecessarily obscure the gist of the present disclosure, detailed description thereof will be omitted. When terms "comprises," "has," "consists of," and the like described in the present specification are used, other parts can be added unless "only" is used. When a component is expressed in the singular, it includes a situation in which the component is provided as a plurality of components unless specifically stated otherwise.

In construing a component, the component is construed as including the margin of error even when there is no separate explicit description.

When the positional relationship is described, for example, when the positional relationship between two parts is described using the term "on," "above," "under," "next to," or the like, one or more other parts can be positioned between the two parts unless the term "immediately" or "directly" is used. Also, the term "can" used herein can include all meanings of the term "may."

When an element or a layer is described as being disposed "on" another element or layer, it includes both a situation in which the element or the layer is disposed directly on another element or layer and a situation in which other layers or elements are interposed therebetween.

Although terms such as first and second are used to describe various components, the components are not limited by the terms. The terms are only used to distinguish one component from another. Therefore, a first component described below can be a second component within the technical spirit of the present disclosure.

The same reference number indicates the same components throughout the specification.

The size and thickness of each component shown in the drawings are shown for convenience of description, and the present disclosure is not necessarily limited to the sizes and thicknesses of the components shown.

Features of various embodiments of the present disclosure can be partially or fully coupled or combined, and as can be fully understood by those skilled in the art, various technical interconnections and operations are possible, and the embodiments can be implemented independently of each other and implemented together in combination thereof.

Hereinafter, embodiments according to the present disclosure will be described in detail with reference to the accompanying drawings.

In the present disclosure, "display device" can include display devices, such as liquid crystal modules (LCMs), organic light emitting diode (OLED) modules, and quantum dot (QD) modules, which include a display panel and a driver for driving the display panel, in a narrow sense. In addition, the display device can also include equipment display devices including laptop computers, televisions, computer monitors, automotive displays, or other forms for a vehicle that are complete products or final products including the LCMs, the OLED modules, the QD modules, or the like, and set electronic devices or set devices, such as mobile electronic devices such as smartphones or electronic pads.

Therefore, the display device in the present disclosure can include the display devices themself in the narrow sense, such as the LCMs, the OLED modules, or the QD modules, and set devices that are application products or end-consumer devices including the LCMs, the OLED modules, or the QD modules.

In addition, in some situations, the LCMs, the OLED modules, and the QD modules composed of the display panel, the driver, and the like are represented by "display device" in the narrow sense, and the electronic devices as final products including the LCMs, the OLED modules, and the QD modules can be separately represented by "set devices." For example, the display device in the narrow sense can be a concept including a display panel of the LCD, the OLED, or the QD and a source printed circuit board (PCB) that is a controller for driving the display panel and further includes a set PCB that is a set controller electrically connected to the source PCB to control the entire set device.

The display panel used in the present embodiment can use any type of display panels, such as LCD panels, OLED display panels, QD display panels, and electroluminescent display panels and is not limited to a specific display panel capable of bezel bending with a flexible substrate for an OLED display panel of one or more embodiments of the present disclosure and a back plate support structure thereunder. In addition, the display panel used in the display device according to one or more embodiments of the present disclosure is not limited to the shape or size of the display panel.

For example, when the display panel is the OLED display panel, the display panel can include a plurality of gate lines and data lines, and pixels formed in intersection areas of the gate lines and the data lines. In addition, the display panel can include an array including a thin film transistor that is an element for selectively applying a voltage to each pixel, an OLED layer disposed on the array, an encapsulation substrate or an encapsulation layer disposed on the array to cover the OLED layer, and the like. The encapsulation layer can protect the thin film transistor, the OLED layer, and the like from an external impact and can prevent moisture or oxygen from permeating the OLED layer. In addition, the layer formed on the array can include an inorganic light emitting layer, such as a nano-sized material layer or quantum dots.

FIG. 1 is a view showing a display device according to an embodiment of the present disclosure.

Referring to FIG. 1, a display device 100 includes a display panel 110, a data driver 120, a gate driver 130, a timing controller 140, a first memory 210, and a second memory 220.

The display panel 110 includes a plurality of gate lines GL and a plurality of data lines DL. A plurality of sub-pixels SP are disposed at locations at which the gate lines GL and the data lines DL intersect. The display panel 110 receives a data voltage Vdata from the data driver 120 through the data line DL. The display panel 110 receives a scan signal SCAN and a sensing signal SENSE from the gate driver 130 through the gate line GL. The gate line GL can be divided into the gate line GL through which the scan signal SCAN is transmitted and the gate line GL through which the sensing signal SENSE is transmitted. Alternatively, both the scan signal SCAN and the sensing signal SENSE can be transmitted through one gate line GL.

The data driver 120 receives image data Sdata from the timing controller 140. The image data Sdata is serial data and includes information about a grayscale value at which each sub-pixel SP should emit light. The data driver 120 converts the image data Sdata into an analog data voltage Vdata and outputs the analog data voltage Vdata to the data line DL. The data driver 120 receives a source output enable signal SOE from the timing controller 140. The source output enable SOE signal is a signal input to a latch which is a component inside the data driver 120. When the source output enable SOE signal is applied, the latch outputs image data of one horizontal line to a digital-to-analog converter. The data driver 120 can be configured in the form of an integrated circuit IC. The data driver 120 will be described below with reference to FIG. 4. The timing controller 140 can also be referred to as a controller. Also, the timing controller, the data driver and the gate driver can be collectively referred to as a controller.

The gate driver 130 outputs signals for controlling the transistors of the sub-pixel SP. The control signals can include, for example, a gate clock GCLK and a gate start pulse GSP. The gate driver 130 outputs the scan signal SCAN for controlling a scan transistor disposed in the sub-pixel SP and the sensing signal SENSE for controlling a sensing transistor to the display panel 110. The gate driver 130 can be positioned at only one side or both sides of the display panel 110 in the form of one or more ICs. The gate driver 130 can be implemented in the form of a gate in panel (GIP) directly embedded in a non-display area of the display panel 110. The gate driver 130 will be described below with reference to FIG. 5.

The timing controller 140 controls the operations of the gate driver 130 and the data driver 120 by supplying various signals to the gate driver 130 and the data driver 120. The timing controller 140 receives a vertical synchronization signal Vsync, a horizontal synchronization signal Hsync, and a data enable signal DE from the outside (or a set system). The vertical synchronization signal Vsync, the horizontal synchronization signal Hsync, and the data enable signal DE are signals for controlling the timing of the display panel 110. In this respect, the signals can be referred to as synchronization signals. The vertical synchronization signal Vsync, the horizontal synchronization signal Hsync, and the data enable signal DE are signals received from the external set system. In this respect, the signals can be referred to as external synchronization signals. In contrast, according to an embodiment of the present disclosure, the timing controller 140 can generate signals for controlling the timing of the display panel 110. The synchronization signal generated by the timing controller 140 can be referred to as an internal synchronization signal. In addition, the timing controller 140 can receive the image data Sdata from the external set system. The timing controller 140 can write the image data Sdata in the memories 210 and 220. The timing controller 140 can read the image data Sdata stored in the memories 210 and 220 and output the image data Sdata to the data driver 120.

The memories 210 and 220 can receive and store the image data Sdata from the timing controller 140. The image data Sdata can be divided into frames and can be a grayscale value assigned to each sub-pixel within each frame. The memories 210 and 220 can be referred to as frame memories. The memories 210 and 220 can be NAND type memories. The image data Sdata stored in the memories 210 and 220 can be read by the timing controller 140 and output to the data driver 120. Operations of the memories 210 and 220 according to the present disclosure will be described below with reference to FIG. 13.

Figure 2:
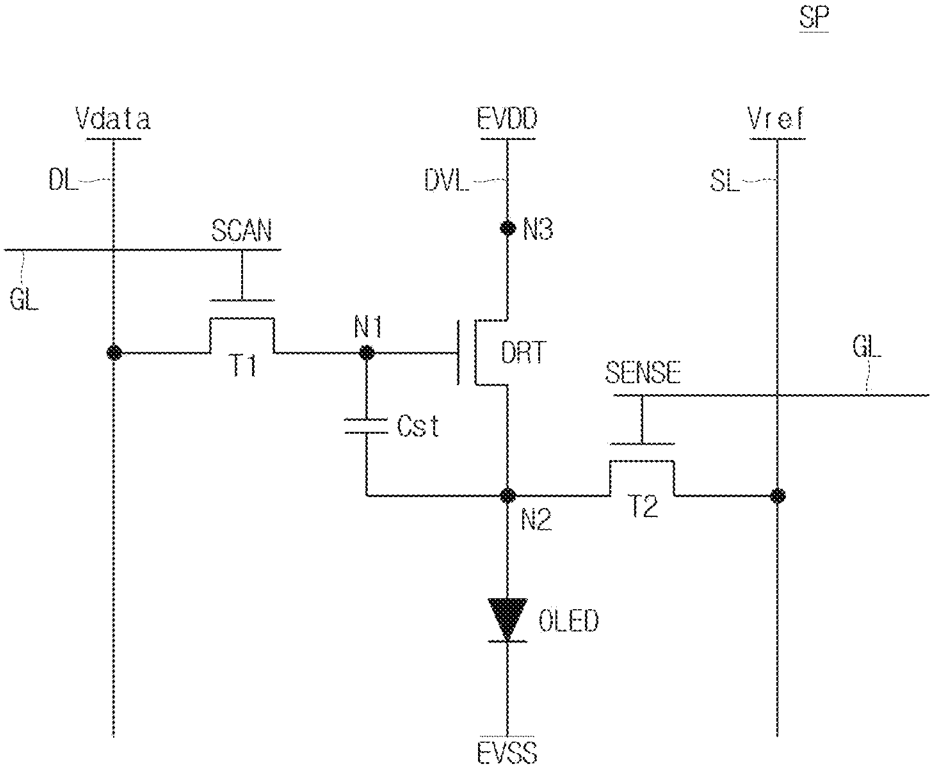
FIG. 2 is a circuit diagram showing a sub-pixel according to an embodiment of the present disclosure.

FIG. 2 is a circuit diagram showing a sub-pixel according to an embodiment of the present disclosure.

Referring to FIG. 2, a data line DL, a gate line GL, a driving voltage line DVL, and a sensing line SL can be disposed in one sub-pixel SP. As shown in FIG. 1, the gate line GL is connected to the gate driver 130, and the scan signal SCAN and the sensing signal SENSE are applied thereto.

The sub-pixel SP includes an organic light emitting diode OLED, a driving transistor DRT, a first transistor T1 connected between a first node N1 and the data line DL, a second transistor T2 connected between a second node N2 and a sensing line SL, and a storage capacitor Cst connected between the first node N1 and the second node N2.

The organic light emitting diode OLED includes an anode, an organic light emitting layer, and a cathode. The second node N2 is connected to the anode, and the low potential voltage EVSS is connected to the cathode. The driving transistor DRT supplies a driving current to the organic light emitting diode OLED. The first node N1 is a gate node of the driving transistor DRT. The second node N2 is a source node of the driving transistor DRT. A third node N3 is a drain node of the driving transistor DRT. The third node N3 is connected to a high potential voltage EVDD.

The storage capacitor Cst can be electrically connected between the first node N1 and the second node N2 to maintain the data voltage Vdata applied through the data line DL for one frame.

The first transistor T1 can be turned on by the scan signal SCAN to apply the data voltage Vdata supplied to the data line DL to the first node N1. The first transistor T1 can be referred to as a switching transistor. The second transistor T2 can be turned on by the sensing signal SENSE to supply a reference voltage Vref to the second node N2. The second transistor T2 can be referred to as a sensing transistor.

As shown in FIG. 2, the gate line GL for applying the scan signal SCAN and the gate line GL for applying the sensing signal SENSE can be lines physically separated from each other. However, both the scan signal SCAN and the sensing signal SENSE can be applied to one gate line GL.

As shown in FIG. 2, the transistors are shown as N type. However, the transistors can also be formed as P-type.

Figure 3:
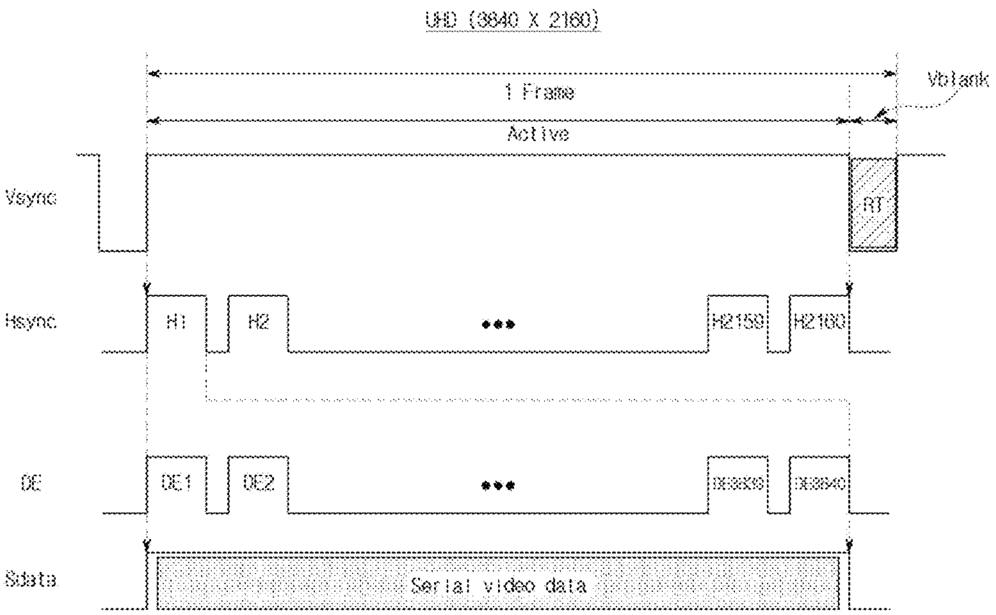
FIG. 3 is a view for describing signals applied to the timing controller from an external system according to an embodiment of the present disclosure.

FIG. 3 is a view for describing signals applied to the timing controller from an external system according to an embodiment of the present disclosure.

Referring to FIGS. 1 and 3, the timing controller 140 receives the vertical synchronization signal Vsync, the horizontal synchronization signal Hsync, the data enable signal DE, and the image data Sdata from the external system.

A display device that expresses Ultra High Definition (UHD) image quality has a total of 3840 vertical lines (e.g., vertical data lines) and a total of 2160 horizontal lines (e.g., horizontal gate lines). For explanatory purposes, an example in which the display device is a UHD display device will be described.

The vertical synchronization signal Vsync is a representative signal for defining one frame. When driven at 480 Hz, images for 480 frames per second are displayed, and thus one frame can be about 2.083 ms. One vertical synchronization signal Vsync can be divided into an active time Active and a blank time Vblank. The active time Active is the time for which images are displayed on the screen of the display device. The blank time Vblank is a preparation time for displaying an image for the next frame. Degradation of the OLED display device can be sensed during the blank time Vblank. The blank time Vblank can be about 0.3 ms. The sensing can be referred to as real-time sensing RT because it is sensing that performed while the display device is being driven. Detailed description of the real-time sensing RT will be made below with reference to FIGS. 8 and 9.

The horizontal synchronization signal Hsync is a signal for defining one horizontal line. Based on UHD, one vertical synchronization signal Vsync includes 2160 horizontal synchronization signals Hsync. The data enable signal DE is a signal for defining the number of sub-pixels shared by one horizontal line. Therefore, one horizontal synchronization signal Hsync includes data enable signals DE corresponding to the vertical lines. Based on UHD, one horizontal synchronization signal Hsync includes 3840 data enable signals DE.

The timings of the signals Vsync, Hsync, and DE are synchronized. Since the timings of the signals are synchronized, the timings of other signals can be calculated using any one signal. For example, the timing of the vertical synchronization signal Vsync can be calculated or the timing of the data enable signal DE can be calculated using the horizontal synchronization signal Hsync.

The image data Sdata together with the signals Vsync, Hsync, and DE is transmitted to the timing controller 140. Therefore, the image data Sdata for one frame can be transmitted while one vertical synchronization signal Vsync is transmitted. As described above, the image data Sdata is a digital signal. The vertical synchronization signal Vsync, the horizontal synchronization signal Hsync, and the data enable signal DE can define which sub-pixel is matched with each bit of the digital image data Sdata.

Figure 4:
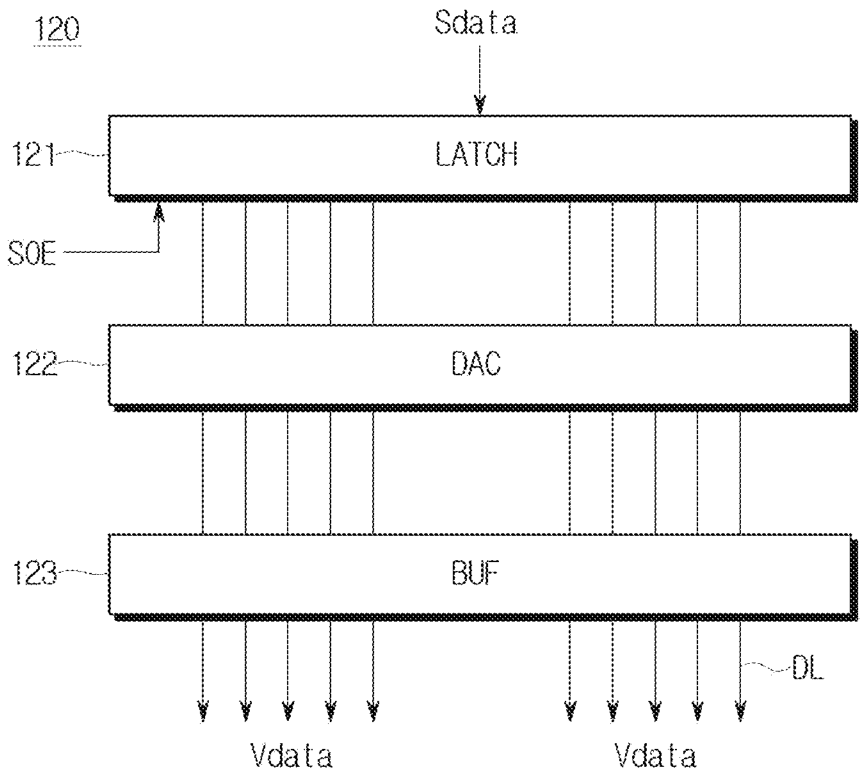
FIG. 4 is a view for describing a data driver according to an embodiment of the present disclosure.

FIG. 4 is a view for describing a data driver according to an embodiment of the present disclosure.

Referring to FIG. 4, the data driver 120 includes a latch 121, a converter 122 (e.g., a digital to analog converter (DAC)), and a buffer 123.

The latch 121 receives the digital image data Sdata from the timing controller 140. The image data Sdata can be transmitted in the form of a data packet including a clock. The latch 121 parallelizes serially input image data Sdata.

The latch 121 receives the source output enable SOE signal from the timing controller 140. The source output enable SOE signal is a signal for defining one horizontal line. The image data Sdata is input to the latch 121 in a serial form, and the source output enable SOE signal during which the image data Sdata of one horizontal line is input. The image data Sdata of the one horizontal line is input to the converter 122.

The converter 122 is a digital-to-analog converter (DAC) for converting a digital signal into an analog signal. The converter 122 converts data input from the latch 121 from a digital format to an analog format. Data output from the converter 122 can have a voltage level boosted by a gamma converter and a level shifter.

The buffer 123 outputs the data voltage Vdata to the data line DL through an output buffer disposed in each channel of the data driver 120. The data voltage Vdata is applied to each sub-pixel, thereby displaying images on the screen of the display device.

Figure 5:
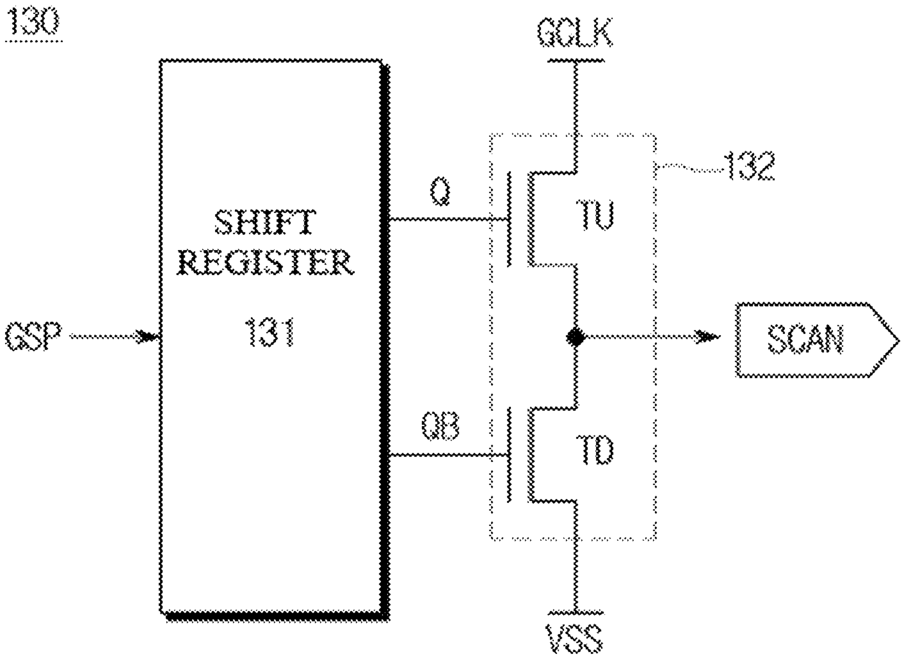
FIG. 5 is a view for describing a gate driver according to an embodiment of the present disclosure.

FIG. 5 is a view for describing a gate driver according to an embodiment of the present disclosure.

Referring to FIG. 5, the gate driver 130 includes a shift register 131 and a buffer circuit 132.

The gate driver 130 receives a gate start pulse GSP from the timing controller 140. The gate driver 130 receives a gate clock GCLK from the timing controller 140. The scan signal SCAN output from the buffer circuit 132 is output to the gate line. As described with reference to FIG. 1, the sensing signal SENSE can be output to the gate line.

When the scan signal SCAN is output to a first gate line GL by the gate start pulse GSP, a carry operation operates the next shift register 131. The next shift register 131 outputs the scan signal SCAN to a second gate line GL.

Therefore, the gate start pulse GSP and the gate clock GCLK can operate to sequentially output the scan signals SCAN of all gate lines GL of the display panel 110.

Specifically, the shift register 131 can control a Q node and a QB node that are connected to the buffer circuit 132. Voltage states of the Q node and the QB node are changed depending on the operating state of the shift register 131. Depending on the states of the Q node and the QB node, the turn-on and turn-off of a pull-up transistor TU and a pull-down transistor TD are controlled. According to such control, the scan signal SCAN at a high level or low level can be output.

Figure 6:
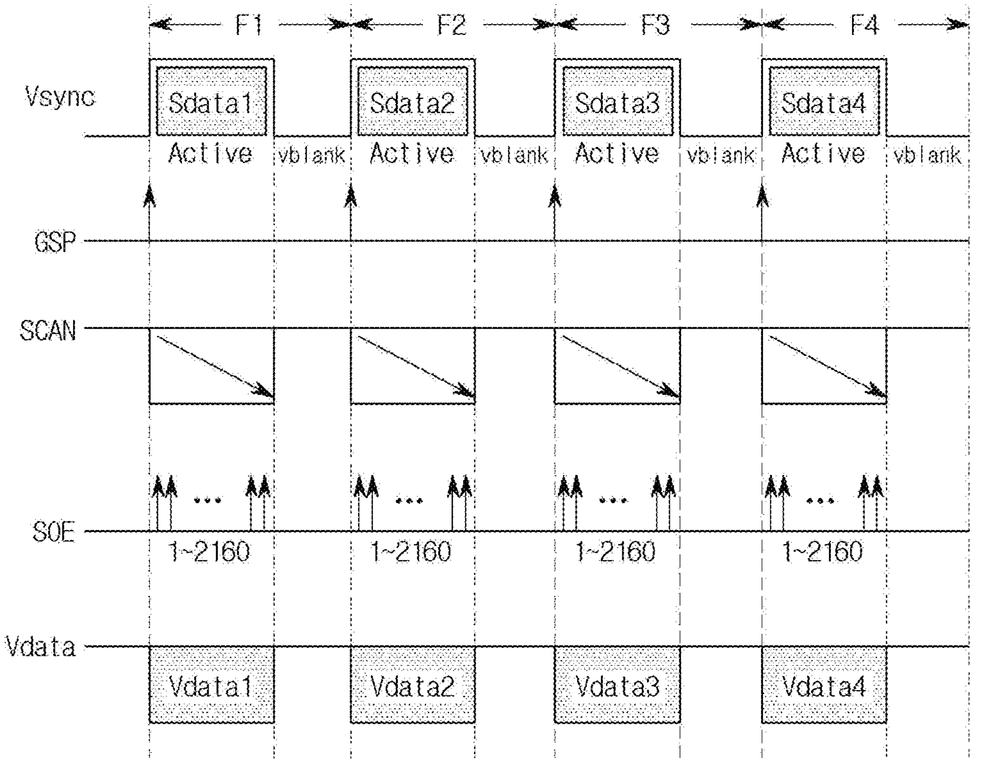
FIG. 6 is a view for describing operation timings of the gate driver and the data driver according to a vertical synchronization signal according to an embodiment of the present disclosure.

FIG. 6 is a view for describing operation timings of the gate driver and the data driver according to a vertical synchronization signal according to an embodiment of the present disclosure.

Referring to FIG. 6, the vertical synchronization signal Vsync is shown, and the vertical synchronization signal Vsync is a signal received by the timing controller 140 from the external system. As described above with reference to FIG. 3, one frame can be divided into the active time Active and the blank time Vblank according to the voltage level of the vertical synchronization signal Vsync. For duration of an active time of a first frame F1, first image data Sdata1 is input to the timing controller 140. During a second frame F2, a third frame F3 and a fourth frame F4, second image data Sdata2, third image data Sdata3 and fourth image data Sdata4 are respectively generated by the timing controller 140.

The gate start pulse GSP is a signal output to the gate driver 130 by the timing controller 140 as described with reference to FIG. 5. Output of the gate start pulse GSP is synchronized with the active time Active of the first frame F1. As the gate start pulse GSP is generated, the scan signal SCAN is sequentially input to each gate line GL. Therefore, the scan signal SCAN is input throughout the display panel 110. The gate start pulse GSP occurs at the same timing even in subsequent frames F2, F3, and F4. Therefore, during each frame, the switching transistors T1 of the sub-pixels SP described with reference to FIG. 2 are turned on.

The timing controller 140 outputs the source output enable SOE signal to the data driver 120 as described with reference to FIG. 4. The source output enable SOE signal is a signal for defining one horizontal line. Therefore, the source output enable signals SOE corresponding to the number of horizontal lines are generated during one frame. For example, in UHD, 2160 source output enable signals SOE are generated during one frame. The source output enable SOE signal occurs during the active time Active of the frame. According to the generation of the source output enable SOE signal, the data driver 120 outputs the data voltage Vdata. The source output enable SOE signal is generated in subsequent frames F2, F3, and F4. Therefore, during the first to fourth frames F1 to F4, first data voltages Vdata1 to fourth data voltages Vdata4 are output sequentially.

As a result, the display device can display images during each frame F1, F2, F3, and F4 by the scan signal SCAN and the data voltages Vdata1 to Vdata4.

When the vertical synchronization signal Vsync is not input to the timing controller 140, the scan signal SCAN and the data voltage Vdata are not output. Therefore, the image is not refreshed (or updated).

Figure 7:
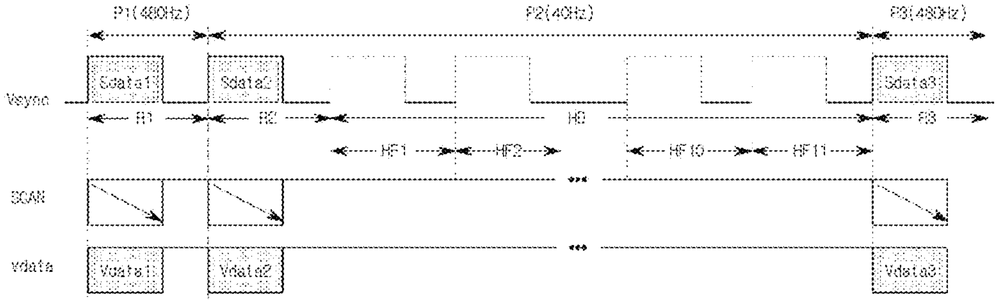
FIG. 7 is a view for describing timings of a vertical synchronization signal, and a scan signal and a data voltage input to a display panel according to a comparative example.

FIG. 7 is a view for describing timings of a vertical synchronization signal, and a scan signal and a data voltage input to a display panel according to a comparative example.

Referring to FIG. 7, a first period P1, a second period P2, and a third period P3 are shown. The first period P1 is a period for which the display device is driven at 480 Hz and is 1/480 s. The second period P2 is a period for which the display device is driven at 40 Hz and is 1/40 s. The third period P3 is a period for which the driving of the display device returns to 480 Hz. Such driving can be referred to as variable frequency driving (VFD). The image data applied to the timing controller 140 during each period is referred to as first image data Sdata1, second image data Sdata2, and third image data Sdata3.

During the first period P1, the scan signal SCAN and the data voltage Vdata1 synchronized with the vertical synchronization signal Vsync are output to the display panel 110. Therefore, the first period P1 can be defined as a first refresh period R1 during which the data voltage is refreshed.

The second period P2 includes a second refresh period R2 and a holding period HD. The holding period HD includes 11 holding frames HF1 to HF11.

During the second refresh period R2 of the second period P2, the scan signal SCAN and the data voltage Vdata2 that are synchronized with the vertical synchronization signal Vsync are output to the display panel 110. The image displayed during the second refresh period R2 is the second data voltage Vdata2.

Subsequent to the second refresh period R2, the vertical synchronization signal Vsync is not input to the timing controller 140. Therefore, the scan signal SCAN and the data voltage Vdata2 are not output to the display panel 110. Alternatively, during the holding period HD, the storage capacitor Cst of the sub-pixel SP holds the second data voltage Vdata2, thus the display panel 110 displays the second data voltage Vdata2 during the second refresh period R2.

According to a comparative example, during the holding period HD of the second period P2 of low-frequency driving, the image data is not updated, but the second image data Vdata2 input during the second refresh period R2 is held. As the holding period HD increases (e.g., as the driving frequency decreases), there is an issue that the driving transistor begins to operate in a saturation area, thereby causing an undesirable increase in the luminance of the screen that may be noticeable to a viewer (e.g., a flicker or an abrupt change in brightness).

According to embodiments of the present disclosure, real-time sensing can be performed while the display panel is being driven. The real-time sensing will be described with reference to FIGS. 8 and 9.

Figure 8:
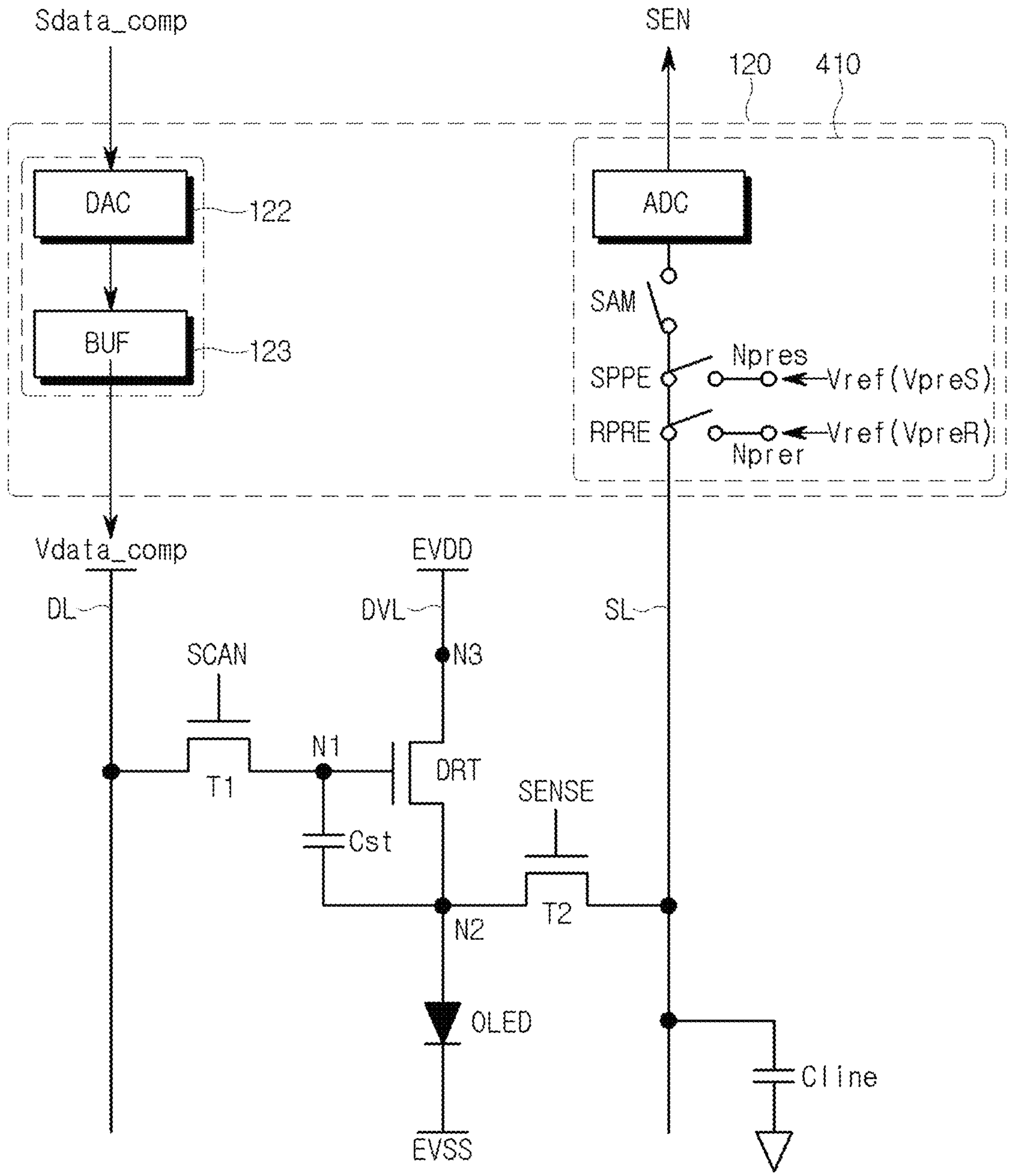
FIG. 8 is a circuit diagram for describing real-time sensing according to an embodiment of the present disclosure.

FIG. 8 is a circuit diagram for describing real-time sensing according to an embodiment of the present disclosure.

Figure 9:
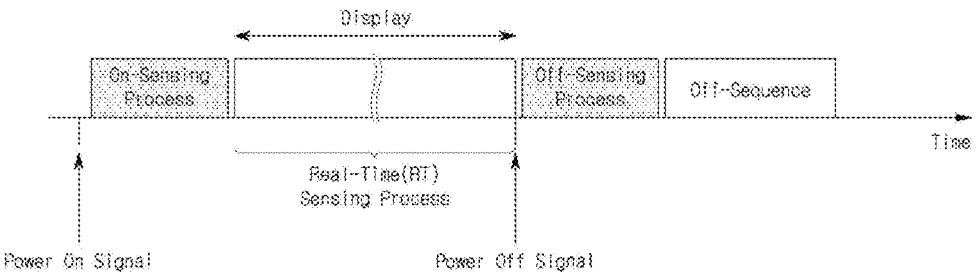
FIG. 9 is a view showing a sensing sequence that can proceed at various timings according to an embodiment of the present disclosure.

FIG. 9 is a view showing a sensing sequence that can proceed at various timings according to an embodiment of the present disclosure.

As described with reference to FIG. 2, the sub-pixel SP according to embodiments of the present disclosure includes the driving transistor DRT. The characteristics of the driving transistor DRT can change over time depending on the driving of the display device. Therefore, the characteristics of the driving transistor DRT should be compensated, and changes in characteristics of the driving transistor DRT should be sensed for compensation.

Referring to FIG. 8, for sensing driving according to embodiments of the present disclosure, a voltage of the sensing line SL can be sensed, and the characteristics of the driving transistor DRT of the sub-pixel SP can be sensed from the sensed voltage. The sensing line SL can output the reference voltage Vref to the sub-pixel SP and output characteristic values of the sub-pixel SP to the data driver 120. The sensing line SL can be referred to as a reference voltage line.

When the sensing drive according to embodiments of the present disclosure is performed, the characteristics of the driving transistor DRT are reflected as Vdata-Vth that is a voltage at the second node N2. Here, Vth is a threshold voltage of the driving transistor DRT.

The voltage at the second node N2 of the driving transistor DRT can be equal to the voltage of the sensing line SL when the second transistor T2 is in a turned-on state. The voltage at the second node N2 is charged to a line capacitor Cline on the sensing line SL.

The sensing circuit 410 includes a converter ADC for converting the sensed analog voltage value into a digital format and outputting the digital voltage value as a sensing value SEN. In addition, the sensing circuit 410 includes switches SAM, SPPE, and RPRE for a sensing operation. The sensing circuit 410 can be disposed inside or outside the data driver 120.

The sensing reference switch SPPE controls the connection between a sensing reference voltage node Npres and the sensing line SL. When the sensing reference switch SPPE is turned on, a reference voltage VpreS for sensing driving is applied to the sensing line SL. The image reference switch RPRE controls the connection between the image reference voltage node Nprer and the sensing line SL. When the image reference switch RPRE is turned on, a reference voltage VpreR for image driving is applied to the sensing line SL.

The timing controller 140 can output image data Sdata_comp whose degradation has been compensated by the sensing value SEN to the data driver 120. The data driver 120 can output the data voltage Vdata_comp whose degradation has been compensated to the sub-pixel.

Referring to FIG. 9, when a power on signal is applied to the display device, an ON sensing process can be performed for about 2 to 3 seconds. In addition, the real-time sensing RT process can be performed while images are displayed on the display device. As described with reference to FIG. 3, the real-time sensing RT can be performed for about 0.2 ms for the blank time Vblank within one frame. In addition, when a power off signal is applied to the display device, an OFF sensing process can be performed for about 300 seconds.

When the power off signal is applied to the display device, the display device is not actually powered off just yet, but performs the sensing driving before completely powering down. When the sensing driving is finished, the display device is finally turned off.

The threshold voltage and mobility of the driving transistor DRT can be sensed by such a sensing sequence. In general, threshold voltage sensing takes a relatively long time, and thus can be performed during the OFF-sensing process (e.g., when the user is finished using the display device anyways). Since mobility sensing takes a relatively short time, the mobility sensing can be performed during the ON sensing process and the real-time sensing process.

Figure 10:
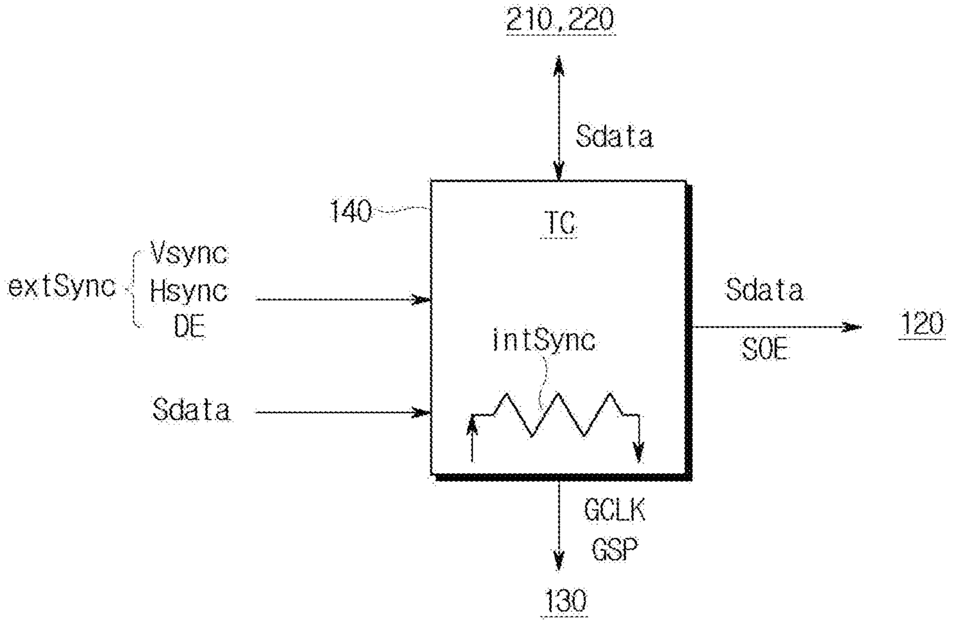
FIG. 10 is a view for describing an operation of the timing controller according to an embodiment of the present disclosure.

FIG. 10 is a view for describing an operation of the timing controller according to an embodiment of the present disclosure.

Referring to FIG. 10, the timing controller 140 can receive the external synchronization signal extSync and generate the internal synchronization signal intSync. The external synchronization signal extSync is a signal received from the external system and includes the vertical synchronization signal Vsync, the horizontal synchronization signal Hsync, and the data enable signal DE as described above with reference to FIG. 3.

The internal synchronization signal intSync is a signal generated by the timing controller 140 itself and can be generated based on the external synchronization signal extSync. For example, the internal synchronization signal intSync can be generated to have the same pulse width as the pulse width of the vertical synchronization signal Vsync, have the same pulse width as the pulse width of the horizontal synchronization signal Hsync, or have the same pulse width as the pulse width of the data enable signal DE. For convenience of description, and the internal synchronization signal intSync will be described as having the same pulse width as the vertical synchronization signal Vsync, but embodiments are not limited thereto.

According to an embodiment of the present disclosure, the internal synchronization signal intSync can be generated at the same frequency as the maximum operable frequency. When an operation frequency of the display device can go up to 480 Hz (e.g., as a maximum operating frequency of the display device), the internal synchronization signal intSync can be generated at 480 Hz, but embodiments are not limited thereto. For example, according to another embodiment, the internal synchronization signal intSync can be generated at a frequency that is less than or different than the maximum operating frequency of the display device.

According to an embodiment of the present disclosure, when the internal synchronization signal intSync is generated, the timing controller 140 can maintain the generated internal synchronization signal intSync. In other words, the timing controller 140 can drive the display device according to the internal synchronization signal intSync even during a period during which the external synchronization signal extSync is not received (e.g., in FIG. 7, the holding frame HF during the second period P2 during which the display device is driven at a low speed). For example, the timing controller 140 can drive the display device according to the internal synchronization signal intSync even during the holding frames HF1 to HD11.

As described above with reference to FIG. 1, the timing controller 140 can receive the image data Sdata from the external system. The timing controller 140 can write the image data Sdata to the memories 210 and 220 and read the image data Sdata stored in the memories 210 and 220. The timing controller 140 can output the read image data Sdata to the data driver 120. According to an embodiment of the present disclosure, the timing of receiving the image data Sdata from the external system and writing the image data Sdata in a memory MEM can be synchronized with the external synchronization signal extSync. In addition, the timing of reading the image data Sdata from the memory MEM can be synchronized with the internal synchronization signal intSync.

In the comparative example described with reference to FIG. 7, when the external synchronization signal extSync is not output to the timing controller 140, the timing controller 140 fails to output the gate clock GCLK and the gate start pulse GSP to the gate driver 130. In addition, the timing controller 140 fails to output the source output enable SOE signal to the data driver 120. Therefore, the timing controller 140 fails to output the scan signal SCAN and data voltage Vdata to the display panel 110.

According to an embodiment of the present disclosure, the internal synchronization signal intSync is generated. The generated internal synchronization signal intSync can control the output timing of the timing controller 140. For example, the output timings of the signals GCLK, GSP, SCAN, and SOE output from the timing controller 140 can be synchronized with the internal synchronization signal intSync. Therefore, the timing controller 140 can output the gate clock GCLK and the gate start pulse GSP to the gate driver 130 based on the internal synchronization signal intSync and output the source output enable SOE signal to the data driver 120. Therefore, the scan signal SCAN and the data voltage Vdata can be repeatedly output to the display panel 110 even during holding periods for low frequency driving. Therefore, during the holding period during which the display device is driven at a low frequency, the data voltage Vdata can be updated. In addition, during the holding period, the real-time sensing RT of the driving transistor DRT can be performed and brightness of the displayed image can be uniformly maintained during the holding periods, and any noticeable change in brightness can be avoided.

According to an embodiment of the present disclosure, the gate clock GCLK and the gate start pulse GSP are output to the gate driver 130 based on the internal synchronization signal intSync. Therefore, the switching transistor T1 of the sub-pixel SP described with reference to FIG. 2 is turned on. During the holding period of the low-frequency driving, the scan signal SCAN can be applied to the display panel 110 by the internal synchronization signal intSync. Therefore, the switching transistors T1 of the sub-pixel SP can be turned on during the holding period of the low-frequency driving even though no new source image data has been received.

According to an embodiment of the present disclosure, the source output enable SOE signal is output to the data driver 120 based on the internal synchronization signal intSync. Therefore, the storage capacitor Cst of the sub-pixel SP described with reference to FIG. 2 is charged. During the holding period of the low-frequency driving, the data voltage Vdata can be applied to the display panel 110 by the internal synchronization signal intSync. Therefore, the storage capacitors Cst of the sub-pixel SP can charge the data voltage Vdata during the holding period of the low-frequency driving.

Such an internal synchronization signal intSync can be generated in advance to have the same pulse width as the external synchronization signal extSync.

Figure 11:
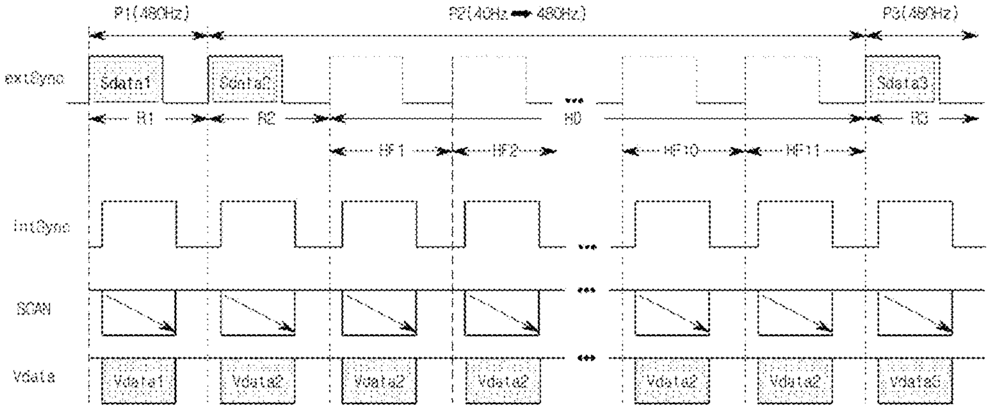
FIG. 11 is a view for describing an operation timing of the display device according to an embodiment of the present disclosure.

FIG. 11 is a view for describing the operation timing of the display device according to an embodiment of the present disclosure.

Referring to FIG. 11, the first period P1, the second period P2, and the third period P3 are shown. The first period P1 is a period for which the display device is driven at 480 Hz and is 1/480 s. The second period P2 is a period for which the display device is driven at 40 Hz and is 1/40 s. The third period P3 is a period for which the driving of the display device returns to 480 Hz. Such driving can be referred to as variable frequency driving (VRR).

In describing an embodiment of the present disclosure, the external synchronization signal extSync indicates a signal input to the timing controller 140 from the external system (e.g., a host system or external source). The external synchronization signal extSync can representatively be the vertical synchronization signal Vsync, the horizontal synchronization signal Hsync, and the data enable signal DE. As described above in FIG. 3, the timings of all of the signals are synchronized. For convenience of understanding, an example in which the external synchronization signal extSync is the vertical synchronization signal Vsync will be described.

During the first period P1, the first image data Sdata1 is applied to the timing controller 140 in synchronization with the external synchronization signal extSync. The internal synchronization signal intSync is generated in advance. As shown in FIG. 11, the internal synchronization signal intSync can have a timing delayed by a predetermined amount of time compared to the external synchronization signal extSync. The scan signal SCAN and the first data voltage Vdata1 that are synchronized with the internal synchronization signal intSync are output to the display panel 110. The first period P1 can be defined as the first refresh period R1 during which the data voltage is refreshed.

The second period P2 includes the second refresh period R2 and the holding period HD. The holding period HD includes 11 holding frames HF1 to HF11.

During the second refresh period R2, the second image data Sdata2 is applied to the timing controller 140 in synchronization with the external synchronization signal extSync. The scan signal SCAN and the second data voltage Vdata2 that are synchronized with the internal synchronization signal intSync are output to the display panel 110.

During the holding period HD, the external synchronization signal extSync is not input to the timing controller 140 (e.g., the external synchronization signal extSync is not received during the holding period HD). Instead, the internal synchronization signal intSync can control the output timing of the timing controller 140 during the holding period HD. The internal synchronization signal intSync is the signal described with reference to FIG. 10 above.

During the holding period HD, the scan signal SCAN and the second data voltage Vdata2 that are synchronized with the internal synchronization signal intSync are output to the display panel 110. To output the second data voltage Vdata2, the timing controller 140 stores the second image data Sdata2 in the memory. A memory in which the second image data Sdata2 is stored is distinguished from a memory in which the first image data Sdata1 and the third image data Sdata3 are stored. Description of the memory will be made below with reference to FIG. 13.

According to the comparative example described with reference to FIG. 7, the image data was not updated during the holding period HD of the second period P2 of the low-frequency driving. However, according to the embodiment described with reference to FIG. 11, the image data can be repeatedly updated even during the holding period HD. Therefore, it is possible to solve a problem of quality degradation caused by an increase in luminance of the screen occurring during the holding period HD.

Subsequently, the third image data Sdata3 is applied to the timing controller 140 in synchronization with the external synchronization signal extSync during the third period P3. The scan signal SCAN and the third data voltage Vdata3 that are synchronized with the internal synchronization signal intSync are output to the display panel 110. The third period P3 can be defined as the third refresh period R3 during which the data voltage is refreshed.

As illustrated, an embodiment of present disclosure generates an internal synchronization signal intSync. Based on the internal synchronization signal, the time controller 140 outputs the gate start pulse GSP to the gate driver 130 and the image data Sdata to the data driver 120. Thus, the scan signal SCAN and the data voltage Vdata can be output to the display panel 110. As a result, even during the holding period, the data voltage Vdata is applied and the image data can be updated in the display panel.

Figure 12:
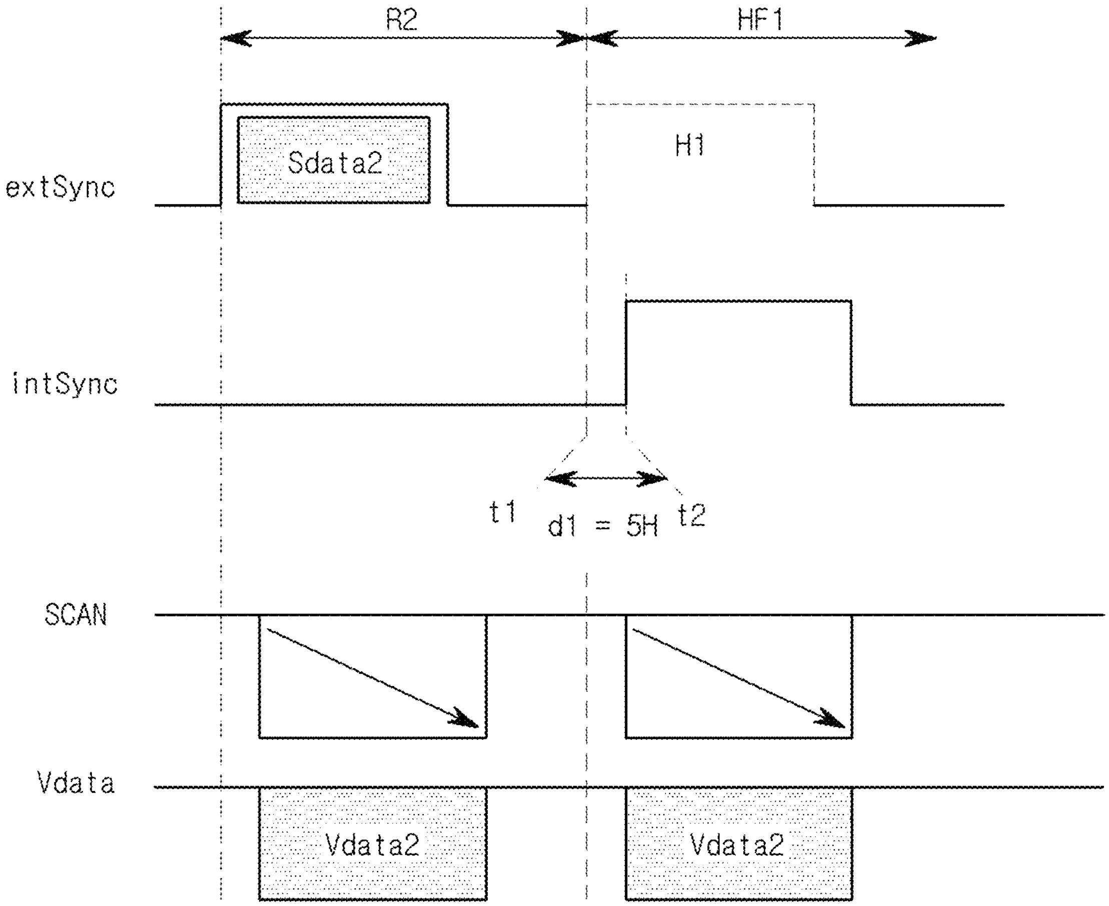
FIG. 12 is an enlarged view of a portion of the operating timing described in FIG. 11 according to an embodiment of the present disclosure.

FIG. 12 is an enlarged view of a portion of the operating timing described in FIG. 11 according to an embodiment of the present disclosure.

The delay between the external synchronization signal extSync and the internal synchronization signal intSync will be described with reference to FIG. 12. In FIG. 12, the second refresh period R2 and the first holding frame HF1 will be described as an example. However, the same technical aspect can also be applied to another time period (e.g., the first refresh period R1 or the third refresh period R3).

Referring to FIG. 12, the second refresh period R2 and the first holding frame HF1 are shown.

As described above, the external synchronization signal extSync is a signal applied to the timing controller 140 from the external system, and the internal synchronization signal intSync is a signal generated by the timing controller 140 itself (e.g., a signal generated within the timing controller 140). A pulse width of the internal synchronization signal intSync can be generated to be the same as a pulse width of the external synchronization signal extSync.

Therefore, to generate the internal synchronization signal intSync, the timing controller 140 uses a the time for calculation. Due to the calculation time, the internal synchronization signal intSync can have a delay time d1 compared to the external synchronization signal extSync. The delay time d1 can be defined as a period between an end time point t1 of the second refresh period R2 and a start time point t2 of the first holding frame HF1. For illustrative purposes, the delay time d1 can have a period of about 5 horizontal periods (5H).

Figure 13:
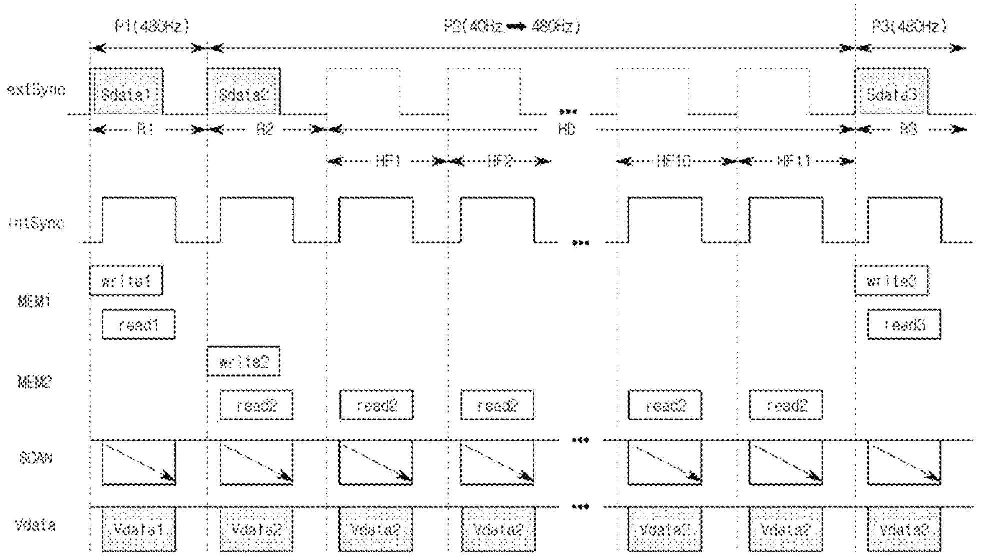
FIG. 13 is a view for describing an operation timing of the display device according to an embodiment of the present disclosure.

FIG. 13 is a view for describing the operation timing of the display device according to an embodiment of the present disclosure.

Referring to FIG. 13, the first period P1, the second period P2, and the third period P3 are shown. The first period P1 is the first refresh period R1. The second period P2 includes the second refresh period R2 and the holding period HD. The holding period HD includes 11 holding frames HF1 to HF11. The third period P3 is the third refresh period R3. The external synchronization signal extSync is input during the first refresh period R1, the second refresh period R2, and the third refresh period R3 and is not input during the holding period HD. The internal synchronization signal intSync is generated during the holding period HD. The embodiment according to FIG. 13 is described with reference to the description of FIGS. 10 to 12.

According to an embodiment of the present disclosure, the internal synchronization signal intSync can be delayed by a preset amount of time compared to the external synchronization signal extSync. When the timing controller 140 writes the image data Sdata received from the external system to the memory MEM, writing the image data Sdata to the memory MEM can be synchronized with the external synchronization signal extSync. In contrast, the signal SCAN output from the gate driver 130 can be synchronized with the internal synchronization signal intSync. In addition, reading the memory MEM to output the image data Sdata from the timing controller 140 to the data driver 120 can be synchronized with the internal synchronization signal intSync. Therefore, the timing at which the data voltage Vdata is output from the data driver 120 to the display panel 110 can be synchronized with the internal synchronization signal intSync.

A first memory MEM1 stores the first image data Sdata1 during the first refresh period R1. The timing controller 140 reads the first memory MEM1 and outputs the first image data Sdata1 to the data driver 120. The data driver 120 outputs the first data voltage Vdata1 to the display panel 110 during the first refresh period R1. For example, the timing controller 140 can write the first image data Sdata1 into the first memory MEM1 when the external synchronization signal extSync is Active. Then, when the internal synchronization signal intSync is Active, the timing controller 140 can read the first image data Sdata1 from the first memory MEM1 and the data driver 120 can output the first data voltage Vdata1 to the display panel 110.

A second memory MEM2 stores the second image data Sdata2 during the second refresh period R2. The timing controller 140 reads the second memory MEM2 and outputs the second image data Sdata2 to the data driver 120. The data driver 120 outputs the second data voltage Vdata2 to the display panel 110 during the second refresh period R2. For example, the timing controller 140 can write the second image data Sdata2 into the second memory MEM2 when the external synchronization signal extSync is Active. Then, when the internal synchronization signal intSync is Active, the timing controller 140 can read the second image data Sdata2 from the second memory MEM2 and the data driver 120 can output the second data voltage Vdata2 to the display panel 110.

The timing controller 140 reads the second memory MEM2 during the holding period HD and outputs the second image data Sdata2 to the data driver 120. The data driver 120 outputs the second data voltage Vdata2 to the display panel 110 during the holding period HD. For example, when the internal synchronization signal intSync is Active, the timing controller 140 can read the second image data Sdata2 from the second memory MEM2 and the data driver 120 can output the second data voltage Vdata2 to the display panel 110. Therefore, the second memory MEM2 can perform writing once and reading multiple times during a period including the second refresh period R2 and the holding period HD. As shown in FIG. 13, the second memory MEM2 performs writing once and reading 12 times.

Subsequently, the first memory MEM1 writes the third image data Sdata3 during the third refresh period R3. The timing controller 140 reads the first memory MEM1 and outputs the third image data Sdata3 to the data driver 120. The data driver 120 outputs the third data voltage Vdata3 to the display panel 110 during the third refresh period R3. For example, the timing controller 140 can write the third image data Sdata3 into the first memory MEM1 when the external synchronization signal extSync is Active. Then, when the internal synchronization signal intSync is Active, the timing controller 140 can read the third image data Sdata3 from the first memory MEM1 and the data driver 120 can output the third data voltage Vdata3 to the display panel 110.

Additionally, the first memory MEM1 and the second memory MEM2 can alternate to store the image data received from outside. For example, the first image data Sdata1 received the first can be stored in the first memory MEM1, the second image data Sdata2 received the second can be stored in the second memory MEM2, the third image data Sdata3 received the third can be stored in the first memory MEM1, and the fourth image data Sdata4 received the fourth can be stored in the second MEM2, and so on.

Figure 14:
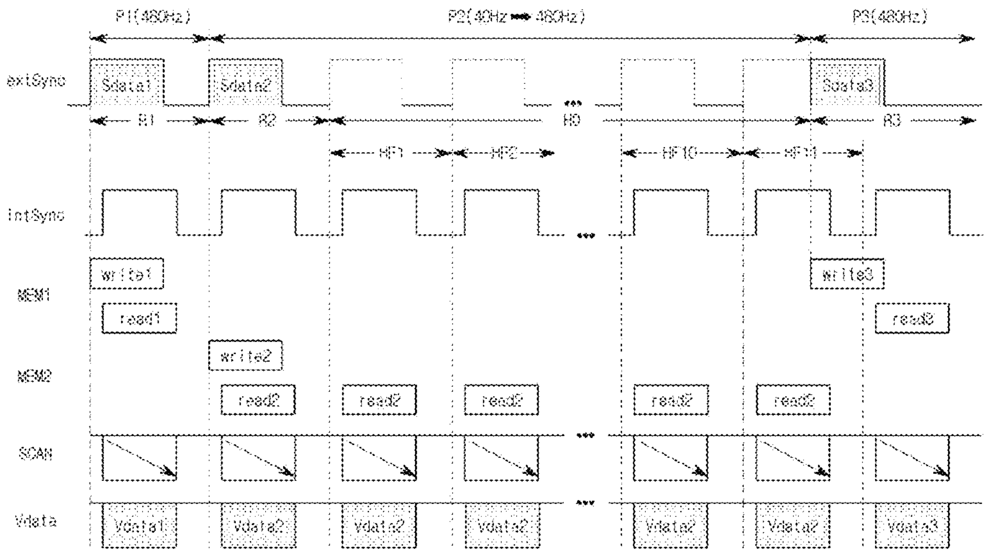
FIG. 14 is a view for describing an operation timing of a display device according to another embodiment of the present disclosure.

FIG. 14 is a view for describing an operation timing of a display device according to another embodiment of the present disclosure.

Referring to FIG. 14, the first period P1, the second period P2, and the third period P3 are shown. The first period P1 is the first refresh period R1. The second period P2 includes the second refresh period R2 and the holding period HD. The holding period HD includes 11 holding frames HF1 to HF11. The third period P3 is the third refresh period R3. The external synchronization signal extSync is input during the first refresh period R1, the second refresh period R2, and the third refresh period R3 and is not input during the holding period HD. The internal synchronization signal intSync is generated during the holding period HD. The embodiment according to FIG. 14 is described with reference to the description of FIGS. 10 to 13 above.

Compared with the embodiment described above with reference to FIG. 13, in the embodiment with reference to FIG. 14, the time point at which the third image data Sdata3 is input during the third period P3 is not synchronized with the internal synchronization signal intSync. When an actual display device is driven, the time point at which the external system outputs the image data Sdata is determined by a user's input, a change in moving images, etc. Therefore, the time point at which the image data Sdata is input to the timing controller 140 from the external system can be random. Therefore, as shown in FIG. 14, new image data Sdata3 can be input while the internal synchronization signal intSync is already active (e.g., at a high level). In other words, the time point at which the driving frequency of the display device is changed can be determined randomly or dynamically determined, and the present embodiment describes a situation where the display driving frequency is switched from a low frequency to a high frequency (or vice versa) while the internal synchronization signal intSync is active (e.g., at a high level). As shown in FIG. 14, the first memory MEM1 stores the third image data Sdata3 in synchronization with the external synchronization signal extSync. The timing controller 140 can read the first memory MEM1 and output the third image data Sdata3 to the data driver 140 in synchronization with the internal synchronization signal intSync. The time points at which the scan signal SCAN is output and the data voltage Vdata3 is output are synchronized with the internal synchronization signal intSync.

According to the embodiment described in FIG. 14, writing the image data Sdata into the memories MEM1 and MEM2 are synchronized with the external synchronization signal extSync. In other words, the image data Sdata input to the timing controller 140 is synchronized with the external synchronization signal extSync. In contrast, the output signal of the timing controller 140 is synchronized with the internal synchronization signal intSync. For example, the scan signal SCAN and the reading of memories MEM1 and MEM2 are synchronized with the internal synchronization signal intSync. As a result, the image data Vdata is also synchronized with the internal synchronization signal intSync. Therefore, even when the time point at which the driving frequency of the display device is changed is determined randomly, a seamless output can be implemented on the screen of the display panel 110.

Figure 15:
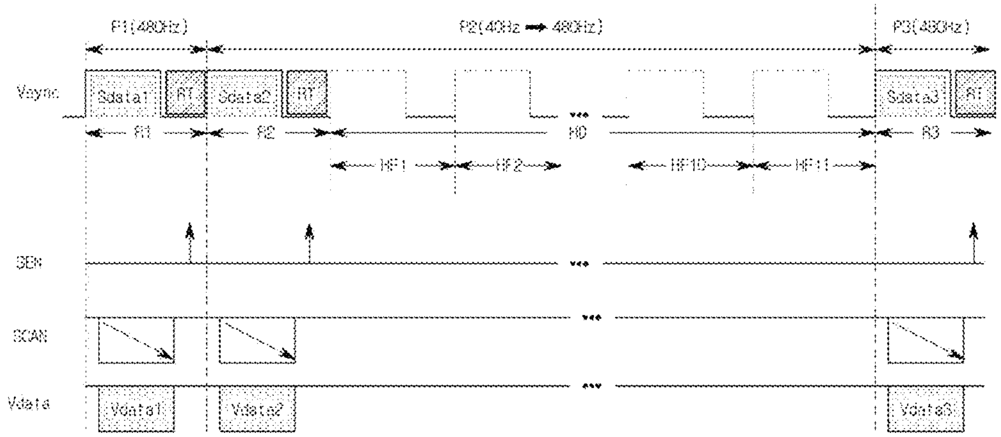
FIG. 15 is a view for describing an operation timing of a display device according to a comparative example.

FIG. 15 is a view for describing an operation timing of a display device according to a comparative example.

Figure 16:
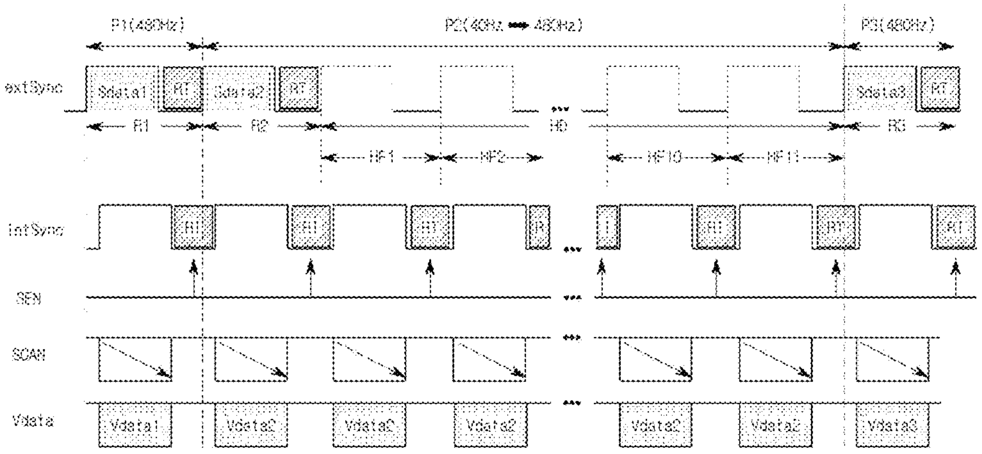
FIG. 16 is a view for describing the operation timing of the display device according to an embodiment of the present disclosure.

FIG. 16 is a view for describing the operation timing of the display device according to an embodiment of the present disclosure.

A real-time sensing operation of the display device according to an embodiment of the present disclosure will be described with reference to FIGS. 15 and 16.

Referring to FIGS. 15 and 16, the first period P1, the second period P2, and the third period P3 are shown. The first period P1 is the first refresh period R1. The second period P2 includes the second refresh period R2 and the holding period HD. The holding period HD includes 11 holding frames HF1 to HF11. The third period P3 is the third refresh period R3. The external synchronization signal extSync is input during the first refresh period R1, the second refresh period R2, and the third refresh period R3 and is not input during the holding period HD.

According to an embodiment of the present disclosure, the internal synchronization signal intSync can be delayed by a preset time compared to the external synchronization signal extSync. The signal SCAN output from the timing controller 140 can be synchronized with the internal synchronization signal intSync. In addition, the reading the memory to output the image data Sdata from the timing controller 140 to the data driver 120 can be synchronized with the internal synchronization signal intSync. Therefore, the timing at which the data voltage Vdata is output from the data driver 120 to the display panel 110 will be synchronized with the internal synchronization signal intSync.

The embodiment according to FIGS. 15 and 16 is described with reference to the description of FIGS. 10 to 12.

The real-time sensing RT is performed during the blank time Vblank as described with reference to FIG. 3. The operation of the sub-pixel SP for performing the real-time sensing RT is described with reference to FIGS. 8 and 9 described above.

The sensing value SEN is output from the data driver 120 to the timing controller 140 through the real-time sensing RT. An output of the sensing value SEN occurs while the real-time sensing RT is performed.

Reference is made to the comparative example described with reference to FIG. 15. The sensing value SEN is not generated during the holding frames HF1 to HF11. The scan signal SCAN is not supplied to the display panel 110 during the holding frames HF1 to HF11. Since the display panel 110 cannot perform the scan operation, the real-time sensing RT cannot be performed, and thus the sensing value SEN cannot be generated and image quality may become impaired during holding frames HF1 to HF11 as characteristics of the subpixels and their corresponding transistors may change during this time and cannot be compensated for.

Reference is made to the embodiment according to the present disclosure described with reference to FIG. 16. The sensing value SEN is repeatedly generated during the holding frames HF1 to HF11. The scan signal SCAN is repeatedly supplied to the display panel 110 during the holding frames HF1 to HF11 because the internal synchronization signal intSync is generated. In other words, the real-time sensing RT is performed during the blank time Vblank of each of the plurality of holding frames HF1 to HF11 even though the timing controller has not received any new image data from the external host. Therefore, a plurality of sensing values SEN can be output during the holding period HD.

According to the embodiment according to the present disclosure, the display panel 110 can perform the scan driving even during the low-frequency driving during which the external synchronization signal extSync is not input to the timing controller 140. Therefore, it is possible to implement the operation of sensing and compensating the degradation of the sub-pixel even during the holding period of the low-frequency driving.

According to embodiments of the present disclosure, disclosed is a display device including a display panel including sub-pixels and configured to operate between a first frequency to an $N^{th}$ frequency which is the maximum frequency, wherein N is a natural number greater than 1, a gate driver configured to output a scan signal to the display panel, a data driver configured to output a data voltage to the display panel, and a timing controller configured to receive an external synchronization signal and image data from the outside, output a gate start pulse to the gate driver, and output the image data to the data driver, wherein the timing controller outputs the gate start pulse and the image data in response to an internal synchronization signal with a frequency equal to the Nth frequency during a holding period. Preferably, the timing controller generates an internal synchronization signal equal to the $N^{th}$ frequency during a holding period.

The gate driver can output the scan signal in synchronization with the internal synchronization signal.

The data driver can output the image data in synchronization with the internal synchronization signal.

The internal synchronization signal can have the same pulse width as the external synchronization signal.

A time point of the internal synchronization signal can be delayed by a preset period from a non-input time point of the external synchronization signal.

The external synchronization signal can include any one of a vertical synchronization signal, a horizontal synchronization signal, and a data enable signal.

The display panel can receive the scan signal and the data voltage during the holding period.

The sub-pixel can include a switching transistor, and the switching transistor can be turned on during the holding period.

The sub-pixel can include a storage capacitor, and the storage capacitor can charge a data voltage during the holding period.

The timing controller can output the image data to the data driver during the holding period.

The display device can further include a first memory for storing first image data during a first refresh period, and a second memory for storing second image data during a second refresh period, in which the second image data stored in the second memory can be output to the data driver during the holding period.

The first memory can store third image data during a third refresh period.

The second memory can perform writing once and reading multiple times during the second refresh period and the holding period.

The holding period can include a plurality of holding frames, and real-time sensing can be performed during each of the plurality of holding frames.

The holding period can include a plurality of holding frames, and the data driver can output a plurality of sensing values during the holding period.

According to the present disclosure, the internal synchronization signal corresponding to the external synchronization signal can be generated. In this situation, the internal synchronization signal can be generated at the $N^{th}$ frequency that is the maximum operating frequency. The internal synchronization signal can be used to operate the timing controller while the external synchronization signal is not applied.

According to the present disclosure, the timing controller can operate the gate driver and the data driver using the internal synchronization signal. Therefore, the display panel can perform the scan driving and the data input driving during the low-frequency driving in which the external synchronization signal is not applied, Therefore, the screen on the display panel can be refreshed even for the holding period of the low-frequency driving. Therefore, it is possible to uniformly maintain the image quality.

According to the present disclosure, the display device includes the first memory for storing the image data input for the first refresh period and the second memory for storing the image data input for the second refresh period. Even when no image data is input from the outside for the holding period following the second refresh period, the image data stored in the second memory can be output to the data driver. Therefore, the screen on the display panel can be refreshed even for the holding period of the low-frequency driving.

According to the present disclosure, the timing controller can operate the gate driver and the data driver using the internal synchronization signal. Therefore, the display panel can perform the scan driving and the data input driving during the low-frequency driving in which the external synchronization signal is not applied, Therefore, the operation for sensing and compensating the degradation of the pixel can be performed even for the holding period of the low-frequency driving.

The embodiments of the present disclosure have been described above with reference to the accompanying drawings. The present disclosure is not necessarily limited to the embodiments. The present disclosure can be modified variously without departing from the technical spirit of the present disclosure. Therefore, it should be understood that the embodiments of the present disclosure are for illustrative purposes rather than limiting the technical contents. The scope of the present disclosure should be construed by the claims. In addition, all technical spirits within the equivalent scope of the claims should be construed as being included in the technical spirit of the present disclosure.

What is claimed is:

1. A display device comprising:

a display panel including sub-pixels and configured to switch between operating at a first frequency and operating at an $N^{th}$ frequency, the $N^{th}$ frequency being a maximum operating frequency of the display panel, N being a positive integer;

a gate driver configured to output a scan signal to the display panel;

a data driver configured to output a data voltage to the display panel; and a timing controller configured to:

receive an external synchronization signal and image data, generate an internal synchronization signal within the timing controller, the internal synchronization signal having a frequency equal to the $N^{th}$ frequency, and in response to generating the internal synchronization signal during a holding period, output a gate start pulse to the gate driver and output the image data to the data driver.

2. The display device of claim 1, wherein the gate driver is further configured to output the scan signal in synchronization with the internal synchronization signal.

3. The display device of claim 1, wherein the data driver is further configured to convert the image data into the data voltage and output the data voltage in synchronization with the internal synchronization signal.

4. The display device of claim 1, wherein the internal synchronization signal has a same pulse width as a pulse width of the external synchronization signal.

5. The display device of claim 1, wherein the internal synchronization signal has a predetermined time delay from the external synchronization signal.

6. The display device of claim 1, wherein the external synchronization signal includes any one of a vertical synchronization signal, a horizontal synchronization signal, and a data enable signal.

7. The display device of claim 1, wherein the display panel is further configured to receive the scan signal and the data voltage during the holding period.

8. The display device of claim 1, wherein the sub-pixel includes a switching transistor, and the switching transistor is turned on during the holding period.

9. The display device of claim 1, wherein each of the sub-pixels includes a storage capacitor, wherein the storage capacitor is configured to charge the data voltage during the holding period, and wherein the holding period is a duration during which the image data is not received by the timing controller and the external synchronization signal is not received by the timing controller.

10. The display device of claim 1, wherein the timing controller is further configured to repeatedly output the image data to the data driver during the holding period.

11. The display device of claim 1, further comprising:

a first memory configured to store first image data during a first refresh period; and a second memory configured to store second image data during a second refresh period, wherein the second memory is configured to output the second image data to the data driver during the holding period following the second refresh period.

12. The display device of claim 11, wherein the first memory is further configured to store third image data during a third refresh period.

13. The display device of claim 11, wherein the first memory and the second memory alternately store the image data every refresh period.

14. The display device of claim 11, wherein the timing controller is further configured to write the image data into the first memory and the second memory in synchronization with the external synchronization signal.

15. The display device of claim 11, wherein the timing controller is further configured to read the image data from the first memory and the second memory in synchronization with the internal synchronization signal.

16. The display device of claim 11, wherein the holding period includes a plurality of consecutive holding frames, and wherein the second image data output during each of the holding frames is stored in the second memory during the second refresh period.

17. The display device of claim 11, wherein the timing controller is further configured to:

perform writing into the second memory once during the second refresh period, and performing reading from the second memory multiple times during the holding period.

18. The display device of claim 1, wherein the holding period includes a plurality of holding frames, and wherein the data driver is further configured to perform real-time sensing of at least one of the sub-pixels during each of the plurality of holding frames.

19. The display device of claim 1, wherein the holding period includes a plurality of holding frames, and wherein the data driver is further configured to output a plurality of sensing values during the holding period.

* * * * *